US006642492B2

(12) United States Patent
Shiota et al.

(10) Patent No.: US 6,642,492 B2
(45) Date of Patent: *Nov. 4, 2003

(54) CALIBRATION APPARATUS FOR LIGHT EMITTING ELEMENTS IN AN OPTICAL PRINTER

(75) Inventors: Akira Shiota, Omiya (JP); Sadao Masubuchi, Chofu (JP)

(73) Assignee: Citizen Watch Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,592

(22) Filed: Jul. 14, 1999

(65) Prior Publication Data

US 2002/0134909 A1 Sep. 26, 2002

(30) Foreign Application Priority Data

Jul. 17, 1998 (JP) .......................................... 10-203508

(51) Int. Cl.⁷ ................................................. G01J 1/32
(52) U.S. Cl. .............................. 250/205; 355/69; 349/3; 347/246
(58) Field of Search .............................. 250/559.1, 234, 250/238, 236, 205; 355/69; 358/475; 349/2, 3, 4; 347/246, 236; 345/102

(56) References Cited

U.S. PATENT DOCUMENTS

| | | | | |
|---|---|---|---|---|
| 4,857,944 A | * | 8/1989 | Hart et al. .................... 346/154 |
| 4,935,772 A | * | 6/1990 | Wakui et al. .................. 355/68 |
| 5,095,319 A | * | 3/1992 | Watarai et al. ............... 346/108 |
| 5,251,021 A | * | 10/1993 | Parulski et al. .............. 358/500 |
| 5,860,029 A | * | 1/1999 | Ichikawa et al. .............. 396/61 |
| 5,966,159 A | * | 10/1999 | Ogasawara ................... 347/133 |
| 6,014,202 A | * | 1/2000 | Chapnik et al. ............... 355/67 |
| 6,064,361 A | * | 5/2000 | Akiyama ...................... 345/98 |
| 6,124,872 A | * | 9/2000 | Matsubara et al. .......... 347/133 |
| 6,163,331 A | * | 12/2000 | Fujita .......................... 347/236 |
| 6,188,427 B1 | * | 2/2001 | Anderson et al. ............ 347/255 |
| 6,233,036 B1 | * | 5/2001 | Masubuchi et al. ........... 355/38 |
| 6,388,694 B1 | * | 5/2002 | Fujita .......................... 347/236 |

* cited by examiner

Primary Examiner—Stephone B. Allen
Assistant Examiner—Eric Spears
(74) Attorney, Agent, or Firm—Smith, Gambrell & Russell, LLP

(57) ABSTRACT

Calibration of the light emitting elements in an optical printer is carried out by mounting the optical printer on an external monitoring apparatus. The external monitoring apparatus comprises: a sensor mounting portion whereon a plurality of photosensors are mounted in a straight line; a signal processing circuit for processing the signals output from the photosensors; a reference voltage generating circuit; and a comparison and control circuit for comparing the output from the signal processing circuit with the reference voltage from the reference voltage generating circuit and outputting a signal based on the results of the comparison. The photosensors receive the light output from the light emitting elements, being subject to calibration, in the optical printer. The signal processing circuit comprises a plurality of integrating circuits which receive the signals output from the plurality of photosensors and integrate those signals over a prescribed period of time; and an arithmetic circuit for calculating the mean value of the output of the integrating circuits and outputting the calibration voltage.

24 Claims, 5 Drawing Sheets

CALIBRATION APPARATUS FOR LIGHT EMITTING ELEMENTS IN AN OPTICAL PRINTER

BACKGROUND OF THE INVENTION

1. Field of the Invention

The present invention relates to a calibration apparatus for adjusting to prescribed values the emission brightness of light emitting elements, such as light emitting diodes, in an optical printer.

2. Description of the Prior Art

An optical printer selectively irradiates a photosensitive body, such as photographic film, with light from the light emitting elements thereof and forms images on the photosensitive body.

Prior to shipment of an optical apparatus, such as an optical printer using light sources comprising red (R), green (G), and blue (B) LEDs, the output voltage or current of the circuit for driving and controlling the quantity of light is usually set to an appropriate value so that these LEDs emit a prescribed quantity of light. In other words, an optical apparatus is shipped out after the calibration of the current value at which color balance is achieved for each R, G, and B LED, for example, so that the R becomes 5 milliamperes, G becomes 30 milliamperes, and B becomes 10 milliamperes.

Such a pre-shipment calibration is carried out by sampling light from a light source under certain conditions with a phototransistor established outside the optical apparatus, converting the sampled light to a voltage value, comparing the converted voltage value to a reference voltage value, and adjusting the output voltage or current of the circuit for driving and controlling the quantity of light so that both values match.

However, such a conventional calibration brings about variations in error due to noise because the photodiode samples an instantaneous value of light from the light source. Moreover, it is not necessarily possible to ensure that the properties of the light from the sampled light source match the properties of light from the light source when the optical printer is actually operating. For these reasons, reliable calibration has not been possible before now.

OBJECTS AND SUMMARY OF THE INVENTION

It is an object of the present invention to provide a highly reliable calibration apparatus for light emitting elements of an optical printer which is not affected by external noise and which performs calibration in accordance with the actual operations of an optical printer.

The light emitting elements to be calibrated with the calibration apparatus of the present invention are those of an optical printer which forms images on a photosensitive body by selective irradiation of a photosensitive body with light from the light emitting elements. The light emitting elements include photosensors for outputting changes in the emission brightness of the light emitting elements as electrical signals. The voltage value of the electrical signals from these photosensors is integrated over a prescribed period. The resulting value is compared with a reference voltage value and the emission brightness of the light emitting elements is adjusted accordingly.

Furthermore, the optical printer is the line scanning type which forms images on the photosensitive body by irradiating each line with light and scanning a prescribed number of lines. The optical printer comprises a liquid crystal shutter which is controlled to pass or block light from each of the pixels on a line individually. Calibration is carried out by the photosensor detecting light transmitted by the liquid crystal shutter.

Also, the optical printer is constituted to be able to form images having a prescribed number of gradations on the photosensitive body by performing gradation control for each pixel by controlling the length of time the liquid crystal shutter allows passage of the light corresponding to each pixel.

Calibration is performed by detecting a light of which graduation control by the liquid crystal shutter is done at about the middle of the prescribed number of gradations.

Furthermore, calibration is performed by detecting light once the emission brightness of the light emitting elements, which varies from line to line, becomes constant.

Furthermore, calibration is performed by detecting a light of a line which is to be at about the middle of a prescribed number of lines drived.

The calibration apparatus for light emitting elements of an optical printer, according to the present invention, has the abovementioned structure and therefore has the following effects.

1. SN ratio of the calibration apparatus can be high, without the photosensor output voltage varying greatly due to external noise light or external noise voltage, by sampling a value obtained by integrating over a prescribed time an output signal of the photosensor which detects light from the light emitting elements to output the detected value as an electrical signal.

2. Exposure light of the prescribed strength can be attained for all gradation regions, by calibrating the light emitting elements by detecting light which passed through the liquid crystal shutter with the photosensor and detecting a light for which the liquid crystal shutter controls its gradation at half the maximum gradation.

3. Exposure light of the prescribed strength can be attained for all regions of all scanning lines, by detecting the light once the brightness due to light emission for each line of light emitting elements becomes constant.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
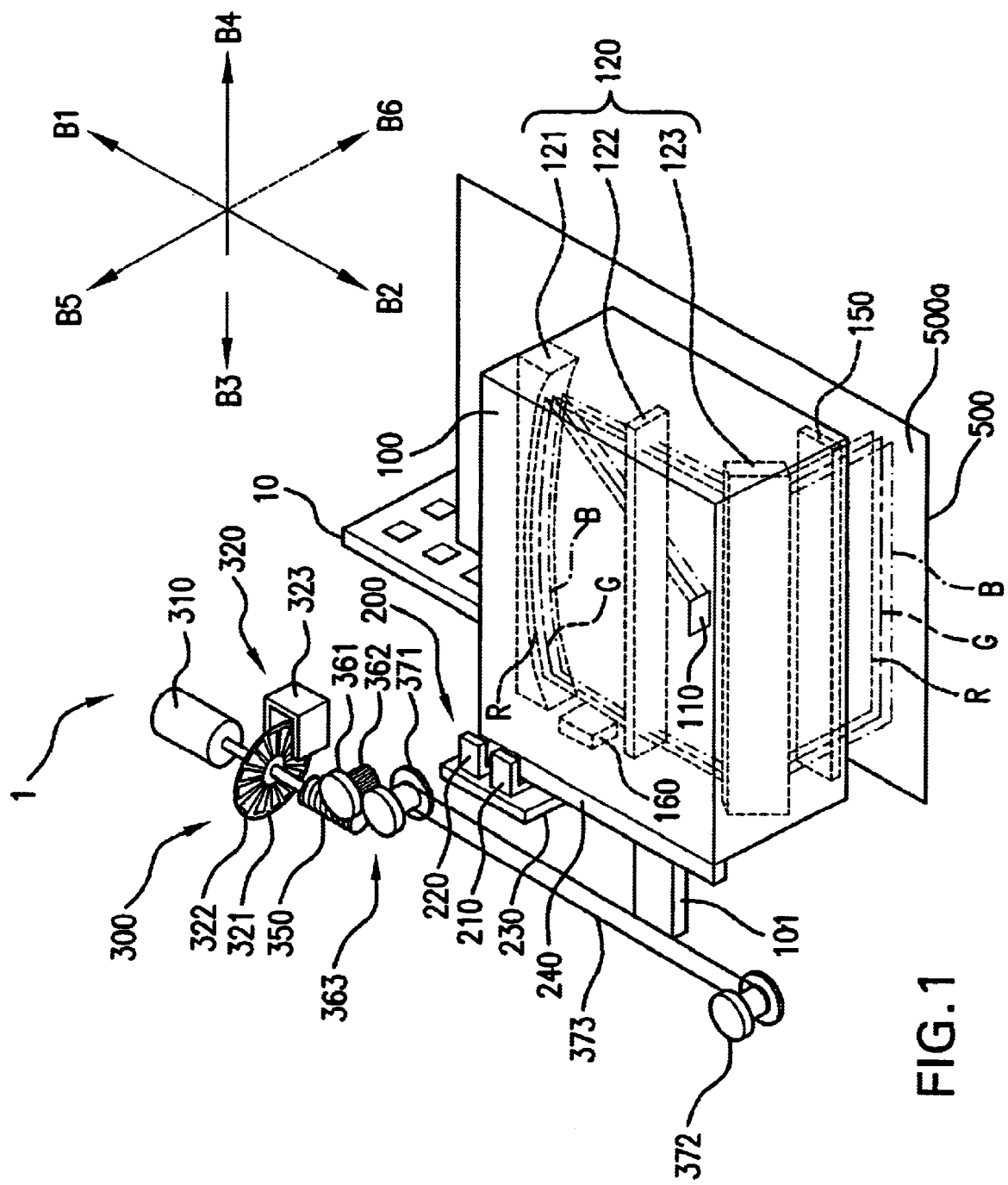
FIG. 1 is an exploded perspective view showing an example of an optical printer having light emitting elements to be calibrated with the calibration apparatus according to the present invention.

An example of an optical printer having light emitting elements to be calibrated by the calibration apparatus, being an embodiment of the present invention, is explained with reference to FIG. 1.

The optical printer 1 comprises an optical head 100, driving control circuit 10, and head transport mechanism 300.

The constitution of the optical head 100 is explained.

The optical head 100 is provided an LED light source 110 and an optical system 120 for controlling the light path of the light from the LED light source 110. The scanning of the optical head 100 is carried out by the head transport means 300 with respect to the photosensitive paper 500 in the direction of the arrow B1.

The LED light source 110 comprises two rows each of LED elements emitting red (R), green (G), and blue (B) light in R-G-B order and positioned vertically in that order over the photosensitive surface 500a of the photosensitive paper 500.

The optical system 120 comprises a parabolic mirror 121, cylindrical lens 122, and reflector 123. The parabolic mirror 121 reflects the light from the LED light source 110 in parallel rays. The cylindrical lens 122 converges the parallel beams reflected from the parabolic mirror 121 in only a direction perpendicular to the photosensitive surface 500a. The focal point thereof is on the photosensitive surface 500a. The reflector 123 reflects light from the cylindrical lens 122 toward the photosensitive paper 500.

Reference numeral 150 denotes the liquid crystal shutter which forms 640 pixels transverse to the photosensitive paper 6, with one scanning electrode and 640 signal electrodes. Reference numeral 160 denotes the internal photosensor which measures the quantity of light within the optical head 1. Reference numeral 10 denotes the driving control circuit for driving and controlling the optical printer.

The constitution of the head transport mechanism 300 is explained next.

The rotary encoder 320 comprises a fin 321 and photo-interrupter 323. A plurality of openings 322 are formed in the fin 321. The fin 321 is fixedly mounted on the rotary shaft of the direct current motor 310 and rotates with the rotary shaft of the direct current motor 310. Light emitting elements and light receiving elements are mounted on the photointerrupter 322 in a manner such that they are opposing each other with the fin 321 therebetween. With the rotation of the fin 321 having the openings 322, interruption and transmission of the light is done between the light emitting elements and light receiving elements. Electrical signals are output in synchronization with the interruption and transmission of the light so that the angle of rotation of the direct current motor 310 is detected.

The rotation of the direct current motor 310 is reduced with the worm gear 350 and gears 361, 362, 363 and rotates the pulley 371. The rotation of the pulley 371 is converted to the linear reciprocating motion of the endless wire 373 wrapped around pulleys 371 and 372. Meanwhile, part of the wire 373 is affixed to the wire fixing portion 101 protruding from the side of the optical head 100. The rotation of the pulley 371 therefore causes the optical head 100 to move in the scanning direction thereof.

A position sensor, comprising a pair of photointerrupters 210, 220, is affixed on the base plate 230 of the optical head 100. The position of the optical head 100 is detected by a light interrupting panel 101 blocking the position sensors 210, 220 as the optical head 100 moves.

Next, the operation of the optical printer 1 in FIG. 1 and the method for forming images on the photosensitive paper are explained.

The LED light source 110 emits light in the sequence R, G, B. The light spreads transversely to the photosensitive paper 500 while reaching the parabolic mirror 121. A band of light, as shown in FIG. 1, is reflected from the parabolic mirror 121. The LED light source 110 emits light which is reflected as it spreads transversely (B3–B4 direction) to the photosensitive paper 500. This light is reflected by the parabolic mirror 121 into beams parallel in a direction transverse to the photosensitive paper 500; the beams advance in a direction opposite to the incoming light and reach the cylindrical lens 122.

The cylindrical lens 122 converges the light from the parabolic mirror 121 in a direction perpendicular (direction B5–B6) to the surface of the photosensitive paper 500. The beam converged by the cylindrical lens 122 is changed by 90 degrees with the flat reflector 123 and becomes a beam perpendicular to the surface of the photosensitive paper 500. Finally, the beam passes through the liquid crystal shutter 150 and exposes the photosensitive surface 500a of the photosensitive paper 500.

The beam reaching the photosensitive paper 500 is converged by the cylindrical lens 122 so as to form an image in a prescribed area of the photosensitive paper 500. The beam which formed an image in the prescribed area of the photosensitive paper 500 becomes an R, G, and B beam in that order in the scanning direction (direction B1).

The optical head 100 moves at a uniform speed in the scanning direction (direction B1) above the photosensitive paper 500. When the read position is detected with the head position detecting mechanism 200, the R LED emits light for a prescribed period of time and exposes a prescribed region of the photosensitive paper 500. Next, the G LED emits light for the same length of time and exposes the same region of the photosensitive paper 500; then the B LED emits light for the same length of time and exposes the same region exposed by R and G.

In this way, while the optical head 100 is moved at a uniform speed with respect to the photosensitive paper 500, the above operations are repeated periodically. The same region on the photosensitive paper 500 is thereby exposed with the three colors of light, R, G, B, and a colored image is formed. Also, gradation control is effected by controlling the exposure time for the three colors, R, G, B, with the liquid crystal shutter 150; this makes it possible to attain full color images.

In the present embodiment, there are 256 gradations for each of the three colors, R, G, B. When the writing of all the image data is complete, the optical head 100 stops scanning at the position where the position sensor 210 turns off and returns once more to the head home position.

Figure 2:
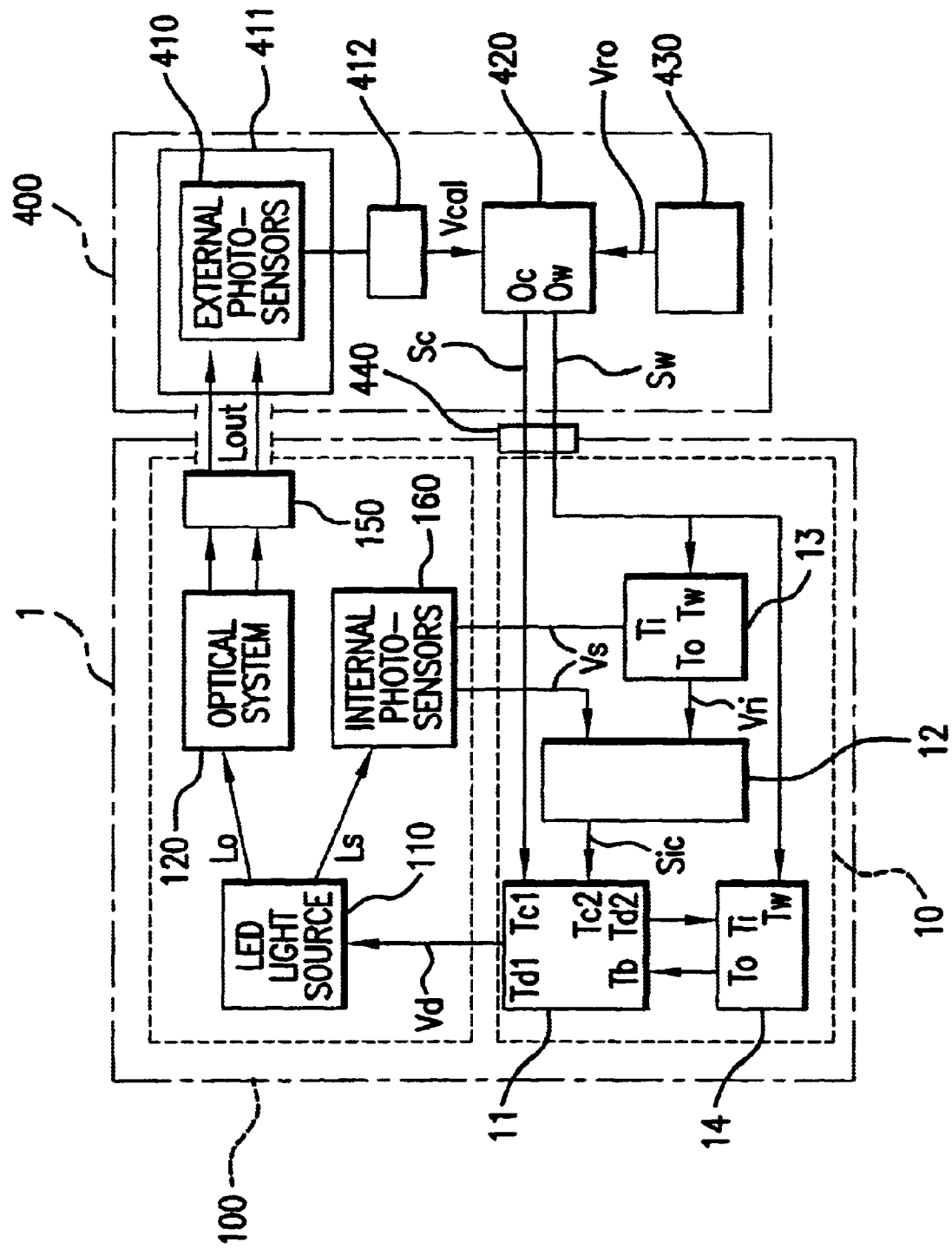
FIG. 2 is a block diagram of the calibration apparatus according to the present invention.

Next, the general form of the system for calibrating the LED light source 110 of the optical printer 1 is explained using the block diagram in FIG. 2.

This system comprises the optical printer 1 and an external monitoring apparatus (calibration apparatus) 400. The optical printer 1 comprises the optical head 100 and driving control circuit 10.

The optical head 100 comprises the LED light source 110, optical system 120, liquid crystal shutter 150, and internal photosensor 160, as discussed above with reference to FIG. 1.

The driving control circuit 10 comprises quantity of light controlling means 11, internal comparison and control means 12, reference value storage means 13, and initial condition storage means 14.

The external monitoring apparatus 400 is electrically connected to the optical printer via a connector 440 only during optical calibration of the optical printer 1. The external monitoring apparatus 400 comprises the external photosensor 410, external comparison and control means 420, and absolute reference voltage generating means 430.

The LED light source 110 of the optical printer 100 is controlled and driven by the driving voltage Vd, output by the quantity of light control means 11 of the driving control circuit 10. When the driving voltage Vd increases, the LED light source 110 emits more light; when the driving voltage Vd decreases, the LED light source emits less light.

Light from the LED light source 110 enters the optical system 120 as exposure light Lo and enters the internal photosensor 160 as reference light Ls. The exposure light Lo passes through the optical system 120 and the liquid crystal shutter 150 and becomes the external exposure light Lout for directly exposing the photosensitive paper 500 (FIG. 1). In this calibration system, however, the external exposure light Lout enters the external photosensors 410 of the external monitoring apparatus 400.

Figure 3:
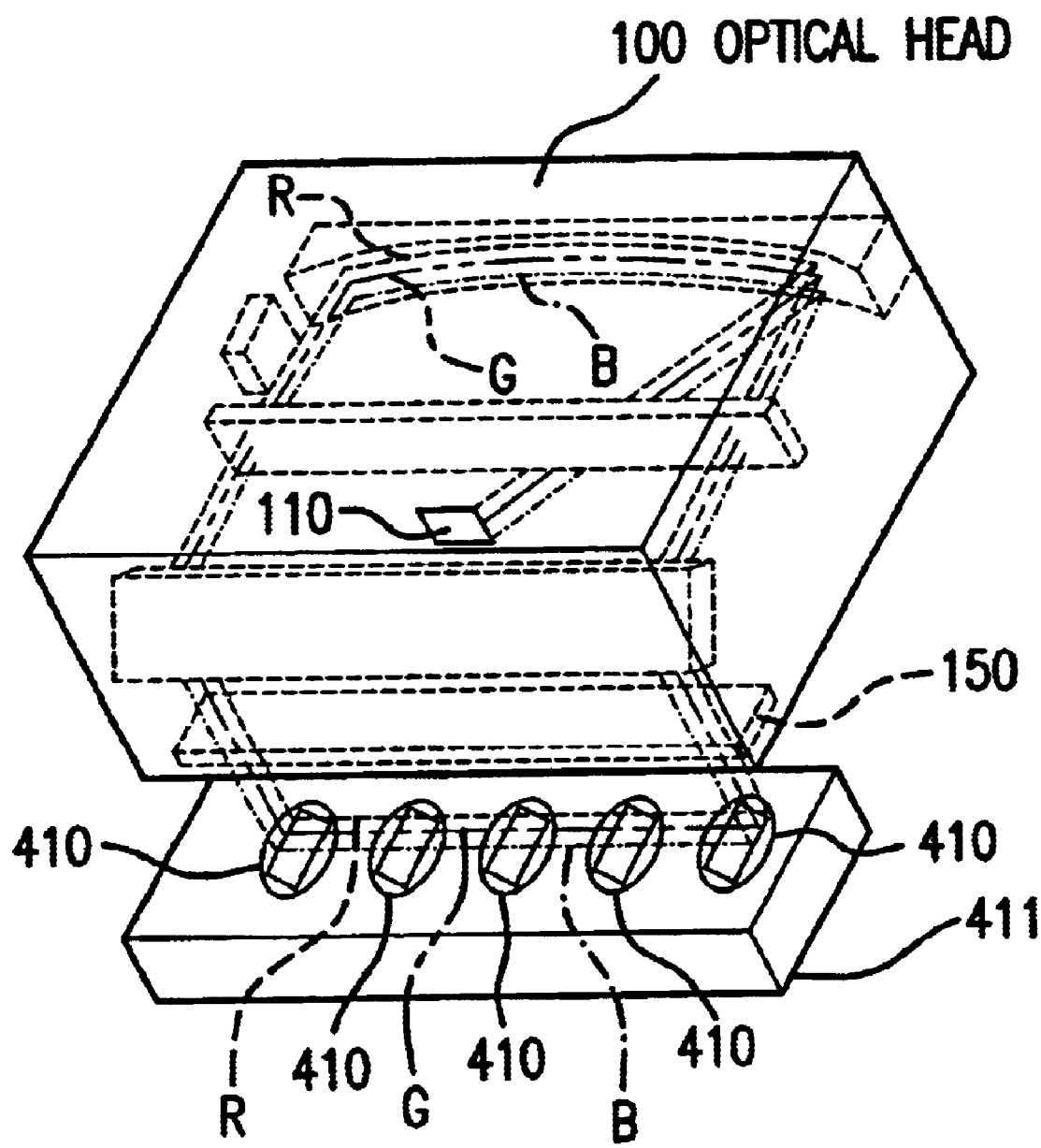
FIG. 3 is a perspective view showing the approximate structure of the calibration apparatus according to the present invention.

As shown in FIG. 3, five (or three) external photosensors 410 are arranged crosswise on the photosensitive paper and receive the light Lout coming outside from the liquid crystal shutter 150 of the optical head 100. The external photosensors 410 send the voltage corresponding to the received quantity of light to the sensor signal processing circuit 412. The sensor signal processing circuit 412 processes (details below) this transmitted voltage signal and outputs this voltage signal as the calibration voltage Vcal.

The external comparison and control means 420 take up the calibration voltage Vcal from the sensor signal processing circuit 412, while taking up the absolute reference voltage Vro output from the absolute reference voltage generating means 430. The external comparison and control means 420 compare these voltages Vcal and Vro and continue to generate the control signal Sc until these match. This control signal Sc enters the quantity of light control means 11 of the driving control circuit 10 and controls the output voltage Vd of the quantity of light control means 11. The quantity of light emitted by the LED light source 110 is controlled by the output voltage Vd.

In other words, a closed loop is formed, which connects a LED light source 110, optical system 120, liquid crystal shutter 150, external photosensor 41, external comparison and control means 420 and quantity of light control means 11.

When the calibration voltage Vcal matches the absolute reference voltage Vro, the external comparison and control means 420 stops generating the control signal Sc and instead generates the write signal Sw. This write signal Sw enters the reference value storage means 13 of the optical printer 1. The internal reference value storage means 13 store the output voltage Vs (that is, the value when LED light source 110 is driven optimally) of the internal photosensor 160 at the time when this write signal Sw is input (when Vcal becomes equal to Vro).

When the internal reference value storage means 13 store the optimum value for the output voltage Vs of the internal photosensor 160 as noted above, the calibration is complete and the external monitoring apparatus 400 is disconnected from the optical printer 1.

Subsequently, during normal use, the internal comparison and control means 12 of the driving control circuit 10 compares the output value of the internal photosensor 160 with the output value of the internal reference value storage means 13 and outputs a control signal Sic. The control signal Sic is input to the quantity of light control means 11, which controls the output voltage Vd according to the value of that signal Sic and drives the LED light source 110 based on that output voltage Vd.

When the external monitoring apparatus 400 is separated from the optical printer 1, as discussed above, a closed loop is formed, which connects a LED light source 110, internal photosensor 160, internal comparison and control means 12 and quantity of light control means 11. The LED light source 110 is driven and the print operation is carried out in the state where the output Vs of the internal photosensor 160 matches the internal reference voltage Vri written to the internal reference value storage means 13.

The value attained by calibrating the optical printer 1 in FIG. 2 using the external photosensor 410 of the external monitoring apparatus 400 is stored one time in the internal reference value storage means 13. Comparing this stored value with the output of the internal photosensor 160 makes it possible to calibrate the optical printer 1 before every operation, as well as before shipment.

It is also possible to perform calibration only before shipment without using the internal photosensor 160. In this case, the quantity of light control means 11 drive the LED light source 110 so as to attain a prescribed brightness, based on the value in the reference value storage means 13, without referring to the value of the internal photosensor.

Next, the case where five external photosensors 410 are arranged transversely to the photosensitive paper is explained using FIG. 3.

The five external photosensors 410 are mounted on a sensor mounting portion 411. The width of the region of the light receiving portions of the external photosensors 410 in the direction of travel of the photosensitive paper is greater than the total of the widths in the scanning direction of the three color, R, G, B, scanning lines. Consequently, with the time-division driving of the three colored beams R, G, B, it is possible for the three colored beams, R, G, B, to fall within (be detected by) the light receiving regions of the five photosensors 410 even if the optical head 100 is not moved.

The optical printer 1 is affixed to the sensor mounting portion 411 so that the rays of R, G, B light from the optical head 100 irradiate the external photosensors 410. The five external photosensors 410 are affixed to the sensor mounting portion 411 at equal intervals (intervals of about 20 mm) in a direction lengthwise to the optical scanning line. The central external photosensor 410 is positioned at the lengthwise center of the scanning line.

Figure 4:
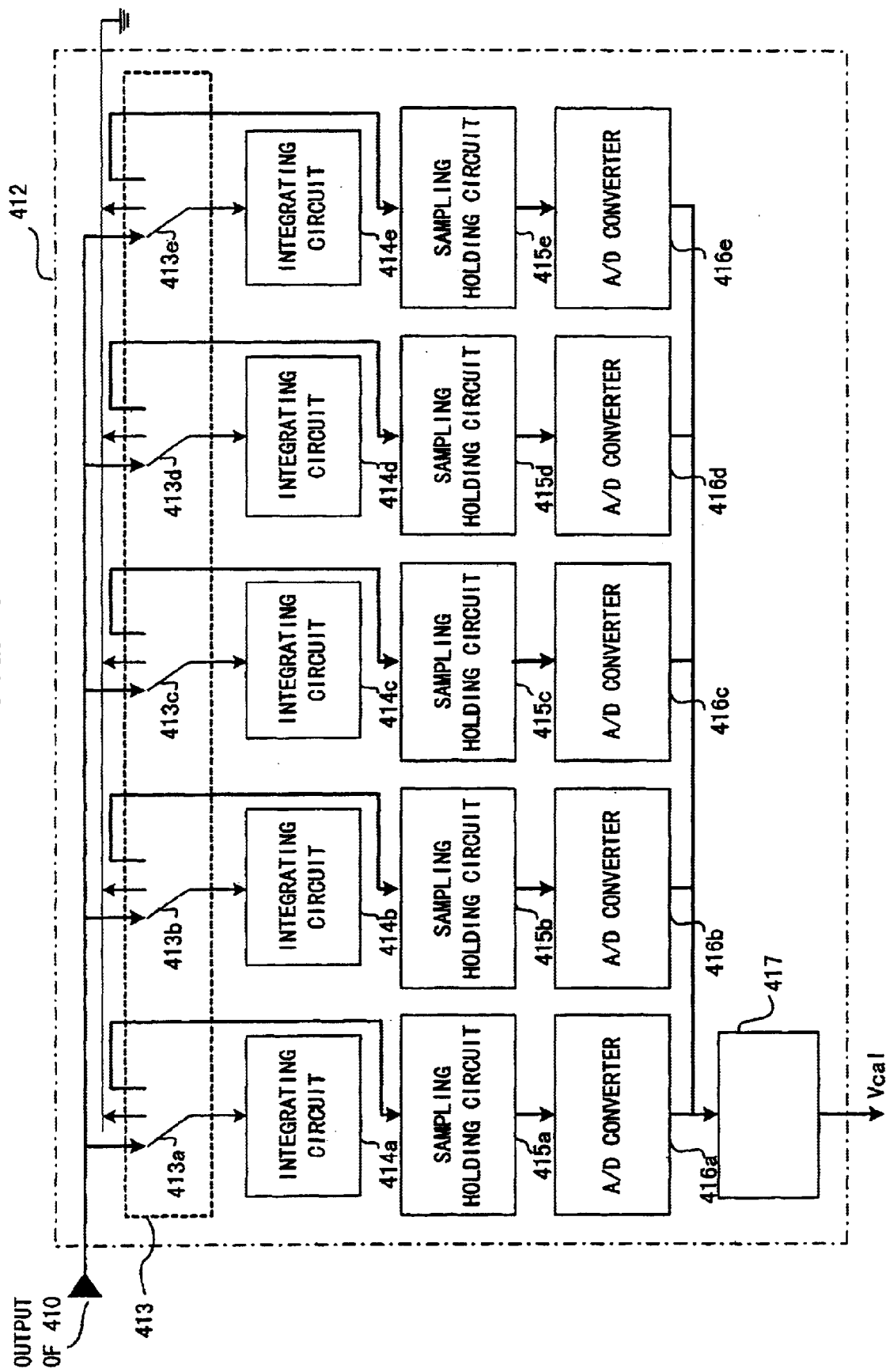
FIG. 4 is a block diagram showing the sensor signal processing circuit in the calibration apparatus according to the present invention.

Next, the sensor signal processing circuit 412 is explained in detail using FIG. 4.

The sensor signal processing circuit 412 comprises five switches 413a–413e for conducting the output from the five external photosensors 410 to any of five integrating circuits 414a–414e for a prescribed period of time, five integrating circuits 414a–414e, five sample holding circuits 415a–415e, five A/D converters 416a–416e, and one arithmetic circuit 417.

The switches 413a–413e switches the timing of the input of the output signal from the external photosensors 410 to the integrating circuits 414a–414e.

The output (analog signals) from the external photosensors 410 passes through the switches 413a–413e and enters the integrating circuits 414a–414e. The output from these integrating circuits 414a–414e passes through the sample holding circuits 415a–415e, enters the A/D converters 416a–416e, and is converted to digital signals. The digitized output signals from the A/D converters 416a–416e are input to the arithmetic circuit 417.

The arithmetic circuit 417 finds the mean value of the outputs (integrated values) of the five external photosensors 410 and outputs the result as the calibration voltage Vcal.

A feature of the calibration apparatus according to the present invention is the inputting of the output from the external photosensors 410 to the integrating circuit 414. Even if electrical noise or light noise from outside is input to the external photosensors 410 and the output voltage of those external photosensors 410 varies, the voltage variations due to noise are smoothed out by integrating the output voltage from the external photosensors 410 over a prescribed period of time, and an output voltage with a very high signal to noise ratio can be attained.

The analog signal is input to the integrating circuit 414 shown in FIG. 4; the integrating circuit then integrates it. However, it is also possible to sample the instantaneous value of the analog signals several times, convert those values to a digital signal by digital processing, and integrate that.

The arithmetic circuit 417 finds the mean value of the integrated output of the five external photosensors 410 to attain the calibration signal Vcal as discussed above; it may also find the mean value of the integrated output of only some, such as the central three, of the five external photosensors 410.

The actual calibration procedure is explained below.
1. Set the optical printer 1 on the sensor mounting portion 411.
2. Set the reference value to the reference value storage means 13.
3. Control the liquid crystal shutter 150 so as to display the $128^{th}$ gradation and have the LED light source 110 emit light for 105 lines as in actual operation of the optical printer.
4. Detect G beam with external photosensors 410 at the $100^{th}$ line before reaching emission of LED light source 110 for 105 lines.
5. With the arithmetic circuit 417, calculate the mean value of the output values of the five, or central three, external photosensors 410 from the G beam; store this value as the calibration voltage Vcal for the G beam.
6. Detect B beam with external photosensors at the $101^{st}$ line.
7. With the arithmetic circuit 417, calculate the mean value of the output values of the five, or central three, external photosensors 410 from the B beam; store this value as the calibration voltage Vcal for the B beam.
8. Detect R beam with external photosensors at the $102^{nd}$ line.
9. With the arithmetic circuit 417, calculate the mean value of the output values of the five, or central three, external photosensors 410 from the R beam; store this value as the calibration voltage Vcal for the R beam.
10. Compare each of the calibration voltages Vcal for R, G, and B with the absolute reference voltages Vro; if there is some difference between Vcan and Vro, change the value of the reference value storage means 13 by a prescribed value so as to eliminate that difference and drive the LED based on this updated value.
11. Return to step 4 and repeat the operations through step 10, end calibration when the difference between the calibration voltages Vcal and the absolute reference voltage Vro is less than a prescribed value.

In the calibration procedure explained above, the brightness of the emissions is sampled for the first time at the 100th line (See the above step 4), without the brightness of emissions from the LED light source 110 being sampled between the first line through the 99th line. The reason for this is explained below with reference to FIG. 5.

Figure 5:
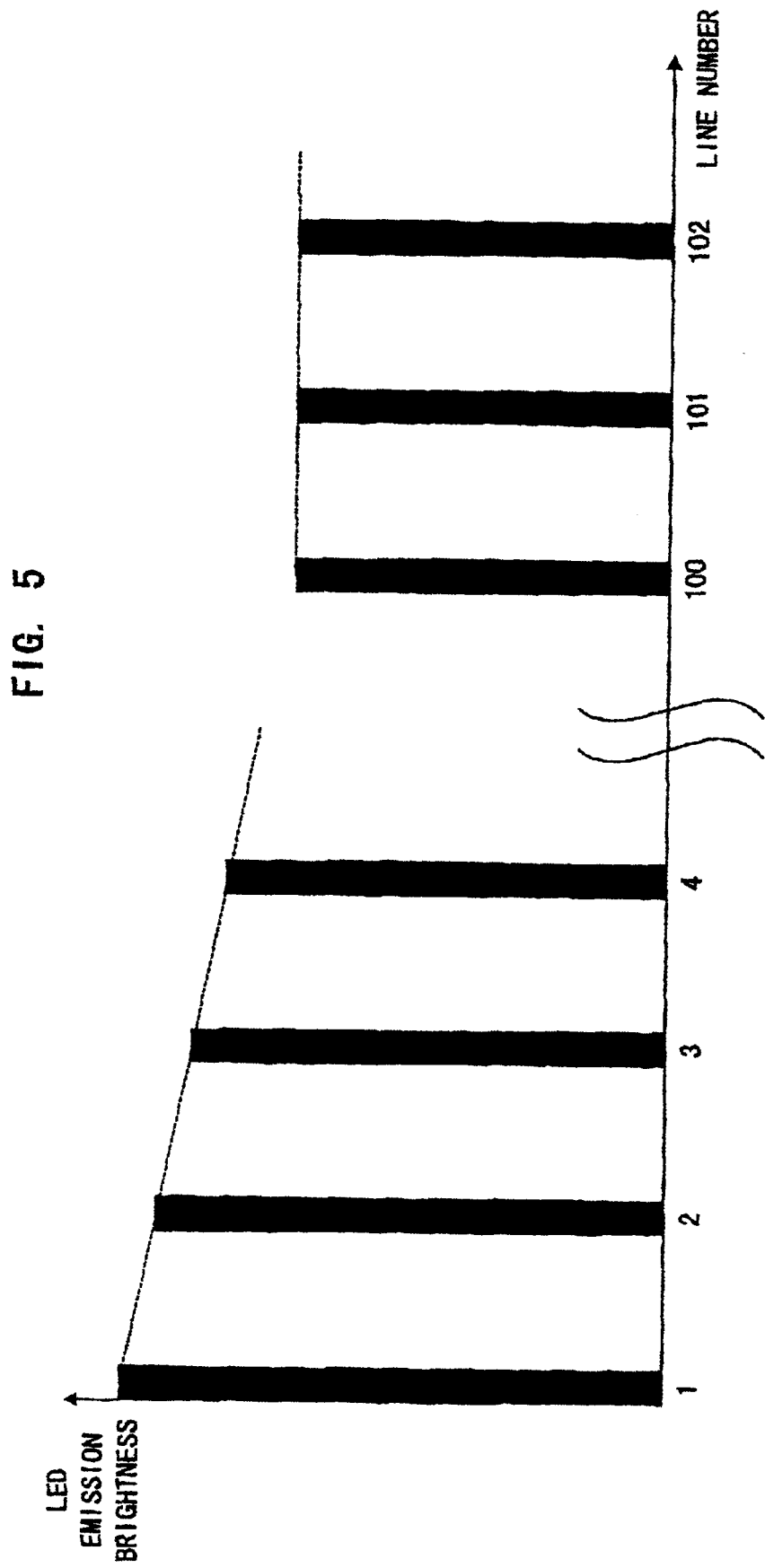
FIG. 5 shows the concept of the change of emission brightness with emission for each line of LEDs in the optical printer.

FIG. 5 shows a bar graph of the line number of the emission of the LED light source 110 and the brightness at that numbered line when the optical printer 1 is driven as in actual operation with the LED light source 110 maintained at a constant driving voltage.

According to the graph in FIG. 5, the electrical resistance in the LED light source 110 drops because of the generation of heat during operation, even if the driving voltage does not change, and brightness gradually decreases from line to line. That decline levels off by the time the $100^{th}$ line is reached and after the $100^{th}$ line, the emission brightness becomes constant.

In consideration of this tendency, the abovementioned calibration procedure has the sampling of the output begin at the time when the emission brightness of the LED light source 110 becomes constant.

What is claimed is:

1. An optical printer which forms images on a photosensitive body by the exposure of the photosensitive body, comprising:

an optical head for exposing the photosensitive body, the optical head including a light source, an optical shutter to control transmission and blockage of light from said light source, and a plurality of photosensors including a first photosensor to detect light, which was irradiated from the light source but has not yet passed through said optical shutter, and output a corresponding signal;

a reference value storing circuit for storing a value of a voltage; and a first comparison and control circuit for comparing the voltage of the signal outputted from said first photosensor with the value stored in said reference value storing circuit to control a quantity of light from said light source;

wherein said photosensitive body is exposed while the first comparison and control circuit performs said comparison and said control of light quantity.

2. The optical printer according to claim 1, wherein a second photosensor detects the light which had been irradiated from said light source and has passed said optical shutter, and the light of said light source is adjusted until said reference value storing circuit stores values of the voltage corresponding to the output of said first photosensor when the output voltage of said second photosensor and a value provided by a reference voltage generating means match 3. The optical printer according to claim 1, wherein
said optical printer is of a line scanning type which forms images on said photosensitive body by irradiating each line with light and scans a prescribed number of lines, and
said optical shutter is a liquid crystal shutter.

4. The optical printer according to claim 3, wherein said first photosensor detects light when an amount of light emitted resulting from said irradiation of each line with light from said light source has become constant, and outputs the signal.

5. The optical printer according to claim 3, wherein
said liquid crystal shutter controls transmission time of light corresponding to individual pixel to control gradation for each pixel so that images having a prescribed number of gradations are formed on said photosensitive body, and
said first photosensor carries out calibration of the light of said light source by detecting the light when gradation to be controlled with said liquid crystal shutter is substantially at a center of said prescribed number of gradations.

6. The optical printer according to claim 5, wherein calibration is effected by detecting light which had been driven from the start of a prescribed number of lines and has just reached around a central line.

7. The optical printer according to claim 3, wherein said optical printer comprises an optical system, the optical system is located between said light source and said liquid crystal shutter so that the light from said light source is linear.

8. The optical printer according to claim 7, wherein said optical system comprises a parabolic mirror, a cylindrical lens and a reflector.

9. The optical printer according to claim 1, wherein said light source emits lights in three colors red (R), green (G), and blue (B).

10. The optical printer according to claim 1, wherein said light source is composed of light emitting diodes (LED).

11. The optical printer according to claim 10, wherein said optical printer has said three colors of LEDs emitting light in a prescribed sequence in a time-divided manner.

12. The optical printer according to claim 11, wherein said three colored beams, R, G, and B, are detected in a time-divided manner.

13. The optical printer according to claim 1, wherein a plurality of photosensors are disposed on one line.

14. The optical printer according to claim 1, wherein calibration is carried out with the mean value of at least three photosensors.

15. The optical printer according to claim 1, wherein said number of photosensors is five.

16. An optical printer which forms images on a photosensitive body by the exposure of the photosensitive body, comprising:
    an optical head which includes a light source, an optical shutter to control transmission and blockage of light from said light source, and a first photosensor to detect light and output a corresponding signal;
    a reference value storing circuit for storing a value of a voltage; and
    a first comparison and control circuit for comparing the voltage of the signal outputted from said first photosensor with the value stored in said reference value storing circuit to control a quantity of light from said light source, wherein
        said first photosensor carries out calibration of said light of said light source by detecting the light which was irradiated from said light source but has not yet passed said optical shutter to output the light,
        said optical printer is of a line scanning type which forms images on said photosensitive body by irradiating each line with light and scans a prescribed number of lines, and
        said optical shutter is a liquid crystal shutter.

17. The optical printer according to claim 16, wherein said first photosensor detects light when an amount of light emitted resulting from said irradiation of each line with light from said light source has become constant, and outputs the signal.

18. The optical printer according to claim 16, wherein
    said liquid crystal shutter controls transmission time of light corresponding to individual pixel to control gradation for each pixel so that images having a prescribed number of gradations are formed on said photosensitive body, and
    said first photosensor carries out calibration of the light of said light source by detecting the light when gradation to be controlled with said liquid crystal shutter is substantially at a center of said prescribed number of gradations.

19. The optical printer according to claim 18, wherein calibration is effected by detecting light which had been driven from the start of a prescribed number of lines and has just reached around a central line.

20. The optical printer according to claim 16, wherein said optical printer comprises an optical system, the optical system is located between said light source and said liquid crystal shutter so that the light from said light source is linear.

21. The optical printer according to claim 20, wherein said optical system comprises a parabolic mirror, a cylindrical lens and a reflector.

22. An optical printer which forms images on a photosensitive body by the exposure of the photosensitive body, comprising:
    an optical head which includes a light source, an optical shutter to control transmission and blockage of light from said light source, and a first photosensor to detect light and output a corresponding signal;
    a reference value storing circuit for storing a value of a voltage; and
    a first comparison and control circuit for comparing the voltage of the signal outputted from said first photosensor with the value stored in said reference value storing circuit to control a quantity of light from said light source, wherein
        said first photosensor carries out calibration of said light of said light source by detecting the light which was irradiated from said light source but has not yet passed said optical shutter to output the light, and
        said light source is composed of light emitting diodes (LED).

23. The optical printer according to claim 22, wherein said optical printer has said three colors of LEDs emitting light in a prescribed sequence in a time-divided manner.

24. The optical printer according to claim 23, wherein said three colored beams, R, G, and B, are detected in a time-divided manner.

* * * * *